Figure 1:
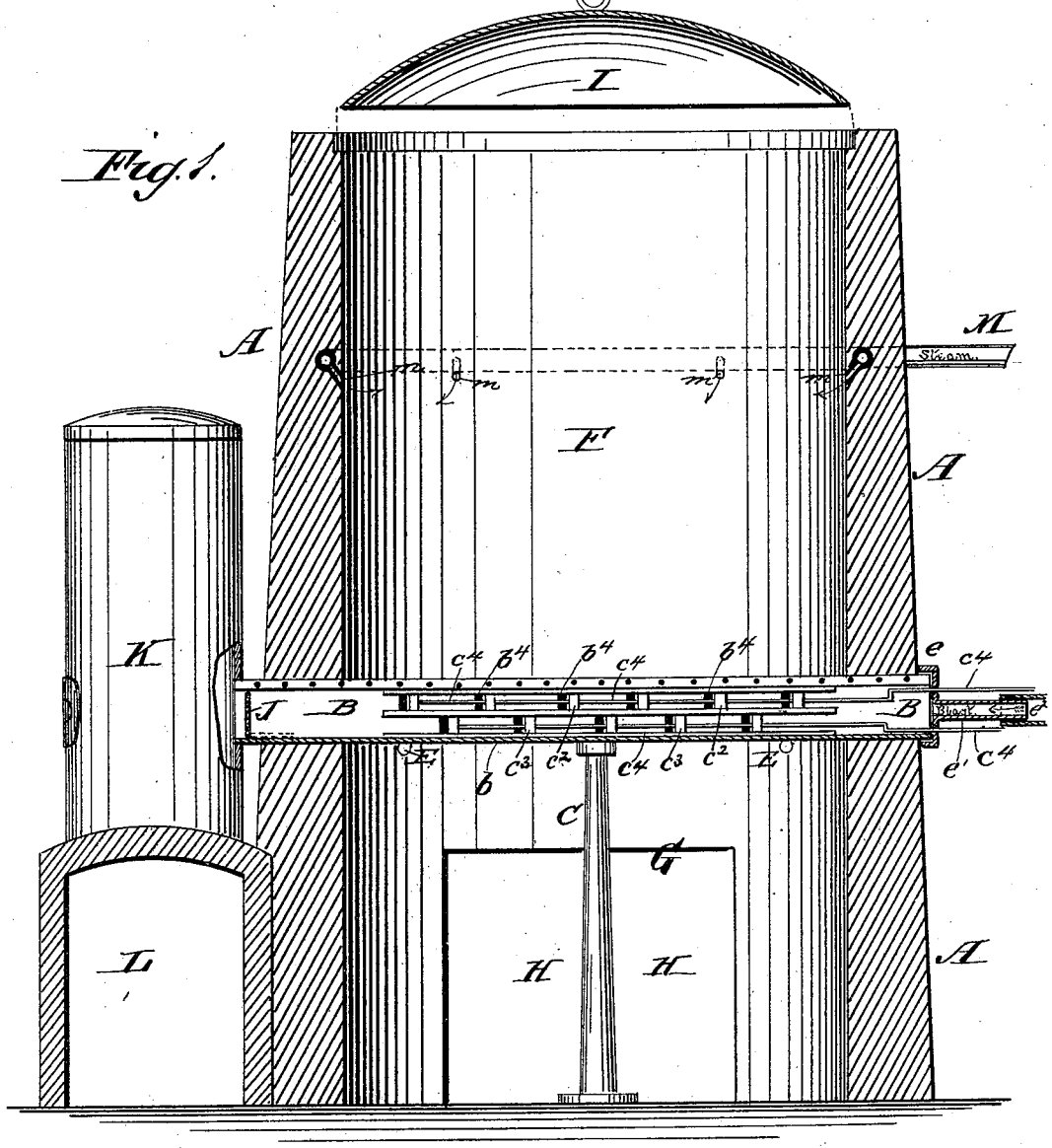

(No Model.)
2 Sheets—Sheet 1.

H. H. HALL.
GAS AND COKE KILN.

No. 287,433. Patented Oct. 30, 1883.

WITNESSES:
F. McArdle,
C. Sedgwick

INVENTOR:
H. H. Hall
BY Munn & Co.
ATTORNEYS.

N. PETERS. Photo-Lithographer. Washington, D. C.

(No Model.) 2 Sheets—Sheet 2.

H. H. HALL.
GAS AND COKE KILN.

No. 287,433. Patented Oct. 30, 1883.

WITNESSES:
F. McArdle
C. Sedgwick

INVENTOR:
H. H. Hall
BY Munn & Co
ATTORNEYS.

UNITED STATES PATENT OFFICE.

HAYDEN H. HALL, OF NEW HAMBURG, NEW YORK.

GAS AND COKE KILN.

SPECIFICATION forming part of Letters Patent No. 287,433, dated October 30, 1883.

Application filed January 24, 1883. (No model.)

*To all whom it may concern:*

Be it known that I, HAYDEN H. HALL, of New Hamburg, in the county of Dutchess and State of New York, have invented a new and Improved Gas and Coke Kiln, of which the following is a full, clear, and exact description.

My invention relates, principally, to apparatus or plant for the production of gas from coal, the structure and adaptation of parts being such as shall secure more economical working and better results as regards the quantity and quality of the gases generated and the quality of the coke produced, the whole plant being specially constructed with a view to such perfect control in operation as shall insure its durability in long-continued service.

The invention consists in a kiln open at the top, for charging and lighting thereat, and having a removable cover, and also a blast and exhaust pipe or flue traversing it at the line of the base, floor, or grate of the charge-receiving chamber, another chamber being provided below the charging-chamber, to receive the coke of each charge by the fall of the sectional floor or grate at the sides of the blast-pipe.

The invention further consists in special constructions of the blast or exhaust pipe in pyramidal cross-sectional form, and with higher and lower rows of exhaust-apertures controlled by independently-working dampers, and protected by overhanging plates or hoods from the drip of the residual tar from the coal. The exhaust-pipe is suitably valved at the gas-discharge end, and fitted with a movable head at the opposite end, having telescopic connection with the valved outlet of a blowing-engine or steam-blast, for a controllable blast-supply and for a means of cleaning the blast-pipe, which communicates with suitable gas-receivers for storing the gases or conveying them for use.

The invention further consists in the arrangement, within the walls of the charge-receiving chamber fitted with a removable cover, and for charging and firing the charge from the top of the kiln, of pipes fitted with nozzles for ejecting superheated steam into the charged coal during the coal-gas generating process, for increasing the downward draft and producing hydrogen gases, to mingle with the coal-gases for intensifying the useful heating effect of the gaseous product, all as hereinafter fully described and claimed.

Reference is to be had to the accompanying drawings, forming a part of this specification, in which similar letters of reference indicate corresponding parts in all the figures.

Figure 2:
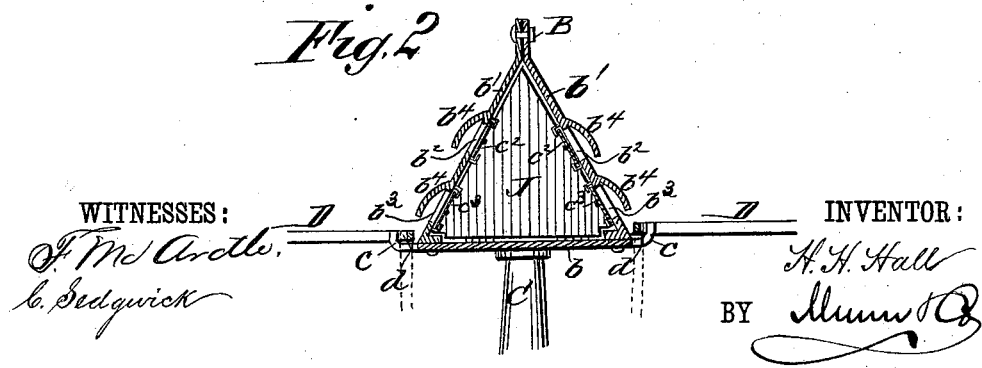
Figure 3:
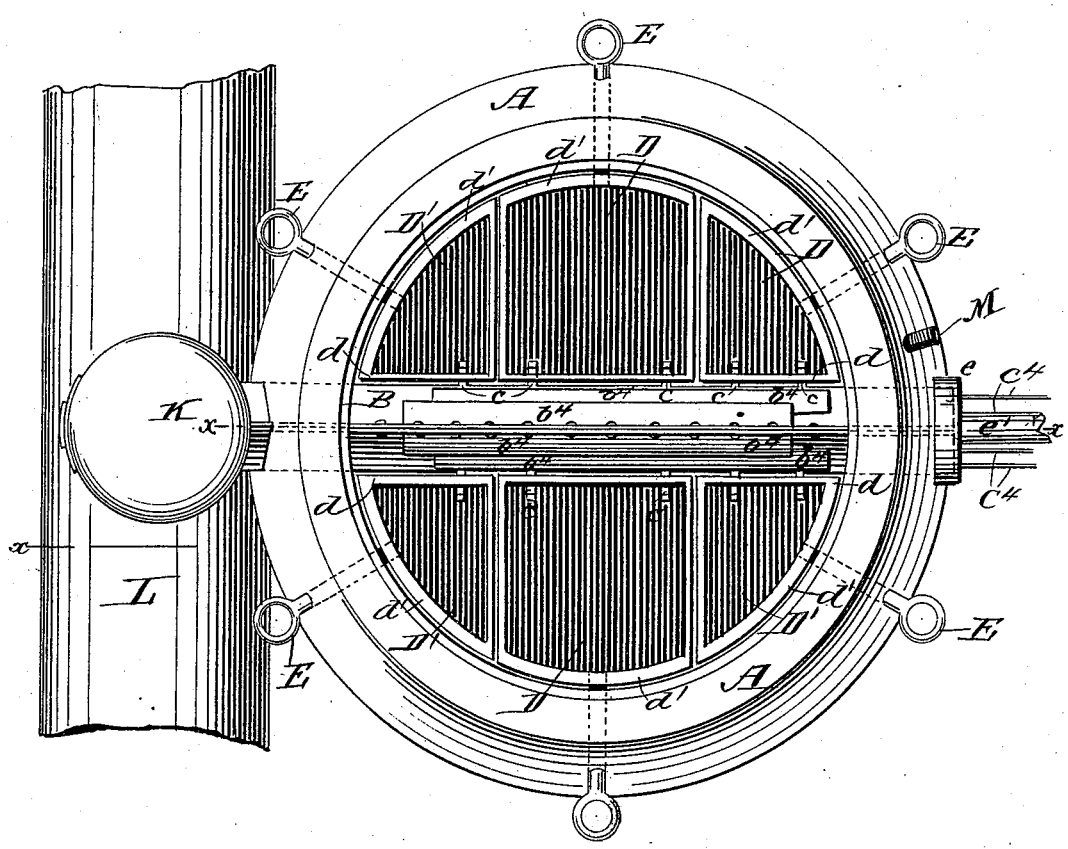
Figure 4:
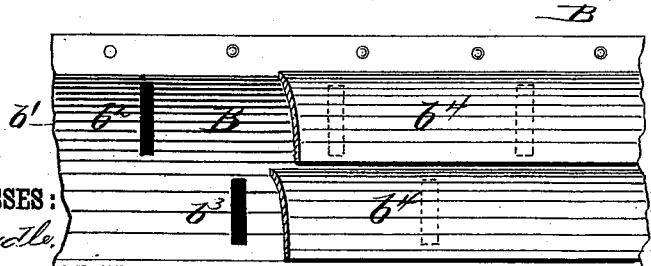

Figure 1 is a vertical sectional elevation of my improved gas and coke kiln with the cover partly raised, the section being on line $x\ x\ x$, Fig. 3. Fig. 2 is a cross-section of the blast or exhaust pipe in larger size. Fig. 3 is a plan view of the kiln with the cover removed, and Fig. 4 is a partial side elevation of the exhaust-pipe on the scale of Fig. 2.

A represents the wall of the kiln, here shown as built up in circular form of about ten feet interior diameter.

B is the blast or exhaust pipe of the kiln, supported at the ends in the wall A, and by one or more pillars, C, the bottom plate, $b$, of the pipe B having hook projections $c$ cast on or secured thereto at intervals for support of the floor or grate sections D D', along the pipe B, by the frame-bars $d$ of the sections resting in the hooks $c$, the floor or grate sections being held up about level by the pins E, fitted to slide in the kiln-walls beneath the outer frame bars or edges, $d'$, of sections D D', to support them, as in Fig. 3, or to be withdrawn to permit the sections to fall or swing downward on the hooks $c$, as in dotted lines, Fig. 2, to empty the coke from the upper charging-chamber, F, to the lower cooling-chamber, G, to be removed through doors suitably fitted at H in the wall of the kiln, the open top of which is fitted to receive the removable cover I, to be lifted by suitable chain or other connections, $i$, for charging chamber F with coal.

I make the exhaust-pipe B, in angular or pyramidal cross-section, of the bottom plate, $b$, and side plates, $b'$, suitably bolted together and positioned apex uppermost, to offer little or no obstruction to the downward working of the fire, to the last of the charge at the bottom of chamber F, and facilitate the discharge of the coke therefrom when the floor-sections D D' are dropped. The side plates, $b'$, are cast or formed with the row of apertures $b^2$ toward the top of the pipe B, controlled by connected slide or other dampers $c^2$, one or more rows of apertures, $b^3$, being provided below apertures $b^2$, and controlled by connected slide or other dampers, $c^3$, overhanging plates or hoods $b^4$ being cast on or fitted to side plates, $b'$, to prevent obstruction of the dampers by the dripping residual tar and other matters from the coal-charge above. The dampers $c^2\ c^3$ are fitted to the inside of the exhaust-pipe B, for protection from the furnace-charge and for unobstructed working by their rods $c^4$, which connect the dampers of each row of apertures in the pipe B, and pass outside of the kiln to be worked for partially or wholly closing either row of apertures $b^2\ b^3$ independently of the other rows for tempering the exhaust to the downwardly-working fire in chamber F, and to prevent overheating of the exhaust-pipe B, in which is fitted at the gas-discharge end the hinged valve J, to be closed when the charge of coke is about to be dropped, to seal the exhaust-pipe against escape of gases from the receiver K, from which they may be conveyed for use through a channel or conduit, L, with which any desired number of the kilns A may connect. At the opposite end the pipe B is fitted with a flanged head, $e$, having a pipe or nozzle, $e'$, telescoping with the discharge-pipe $e^2$ of a blowing-engine or steam-blast apparatus, which is suitably valved to regulate the pressure as desired. This construction permits the head $e$ to slide back for access to the interior of pipe B, for cleaning it when necessary.

M represents a pipe for conveying steam from any source to the coking charge through the connected nozzles $m$, the pipe being preferably embedded in the walls of the kiln for highly superheating the steam prior to its discharge into chamber F, for more effective exhaust, and for decomposition therein for generating hydrogen gases to mingle with the gaseous products from the coal for increased heating effect of the gases in metallurgical furnaces which may connect with the kilns for a gaseous-fuel supply.

In operation, the cover I is lifted and chamber F charged with coal, which rests on the level bottom or grate D D' and the exhaust-pipe B, the cover I being lowered and tamp-jointed, and the lower doors at H being properly closed. The exhausting action of pipe B continuously draws the fire downward in the kiln, liberating the gases from the coal and carrying them to the receiver and conduit K L. As the fire reaches and passes pipe M, the superheated steam discharged therefrom acts to increase the power of the exhaust, and the steam being decomposed, hydrogen gases are generated and intermingled with the coal gases, as above described. The residual tar from the coal-charge descends to and through the floor D D' into the cooling-pit below, and as the fire descends to the apex of the exhaust-pipe the upper dampers, $c^2$, are gradually closed, and the lower rows of dampers, $c^3$, as the fire descends, are likewise operated for closely controlling the blast, as required, for avoiding overheating of the exhaust-pipe and bottom grate or floor of the chamber F, and insuring the durability of the apparatus. The gases being thus drawn from the charge, the blast from pipes $e^2$ and M is cut off and the valve J closed, when the charge of coke may be emptied into the cooling-chamber G by withdrawing the pins E and permitting the grate-sections D D' to drop either simultaneously or one at a time, as desired, and while the coke is being removed from chamber G the upper chamber, F, may be recharged with coal, thus permitting the nearly continuous working of the plant, which produces gases of high calorific value and a coke of even and desirable quality.

The floor or bottom D D' may consist of a single section at each side of the blast-pipe, or be formed thereat in more than three sections, as desired; but the construction shown is preferred, and the use of the steam-discharge pipe M is not necessary to the successful working of the apparatus, but the acceleration of the downward blast or exhaust thereby is a desirable feature.

Having thus described my invention, I claim as new and desire to secure by Letters Patent—

1. A gas and coke kiln constructed, substantially as herein shown and described, with an open top fitted with a removable cover and a blast or exhaust pipe, and dumping grate or floor sections forming the floor of the charging-chamber, as set forth.

2. A gas and coke kiln constructed with an open top fitted with a removable cover, a floor for the charging-chamber formed by a blast or exhaust pipe and adjacent dumping sections, and a coke receiving and cooling chamber located beneath the charging-chamber, substantially as shown and described.

3. In gas and coke producing apparatus, an open-topped kiln fitted with a removable cover, and a charging-chamber floor formed of an apertured blast or exhaust pipe and adjacent dumping sections, a controllable blast-inlet to the exhaust-pipe, and a valved outlet to a gas receiver or conduit, all combined and arranged for joint operation, substantially as shown and described.

4. The combination, with the kiln A, of the exhaust-pipe B, having hook projections $c$, the grate or floor sections D D', and the pins E, substantially as shown and described.

5. The exhaust-pipe B, constructed with upper and lower rows of apertures, $b^2\ b^3$, controlled by independently-working rows of dampers $c^2\ c^3$, substantially as shown and described.

6. The combination, with the pipe B, apertured at $b^2\ b^3$, and the dampers $c^2\ c^3$, of the hoods $b^4$, substantially as shown and described.

7. The combination, with the pipe B, of the discharge-pipe $e^2$ of a blast apparatus, and a flanged head, $e$, fitted over one end of the pipe B, and provided with a nozzle, $e'$, telescoping with the discharge-pipe $e^2$ of the blast apparatus, substantially as described, whereby the said flanged head can be slid back and access had to the interior of the pipe B for cleaning it, as set forth.

8. The combination, with the kiln A, of the damper-controlled exhaust-pipe B, of pyramidal cross-section, set apex uppermost, and the dumping sections D D', substantially as shown and described.

9. The combination, with the kiln A and exhaust-pipe B, of the steam-jet pipe M, substantially as shown and described.

10. The combination, in a gas and coke producing apparatus, of the kiln A, open at the top and fitted with a removable cover, I, a pipe, B, for downward exhaust, and a steam-jet pipe, M, substantially as shown and described.

HAYDEN H. HALL.

Witnesses:
HENRY L. GOODWIN,
C. SEDGWICK.